United States Patent
D'Agostino et al.

(10) Patent No.: US 10,976,156 B2
(45) Date of Patent: Apr. 13, 2021

(54) ROLLING VIRTUAL WHEEL SPINDLE CALIBRATION

(71) Applicant: Snap-On Incorporated, Kenosha, WI (US)

(72) Inventors: Robert J. D'Agostino, Conway, AR (US); Michael G. Fuhrman, Pittsburg, PA (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 16/901,709

(22) Filed: Jun. 15, 2020

(65) Prior Publication Data

US 2020/0309517 A1    Oct. 1, 2020

Related U.S. Application Data

(63) Continuation of application No. 16/441,116, filed on Jun. 14, 2019, now Pat. No. 10,684,125, which is a (Continued)

(51) Int. Cl.
*G01B 11/275* (2006.01)

(52) U.S. Cl.
CPC ...... *G01B 11/2755* (2013.01); *G01B 2210/14* (2013.01); *G01B 2210/16* (2013.01);
(Continued)

(58) Field of Classification Search
CPC ............ G01B 11/2755; G01B 2210/30; G01B 2210/16; G01B 21/26; G01B 2210/14;
(Continued)

(56) References Cited

U.S. PATENT DOCUMENTS 5,535,522 A   7/1996 Jackson
5,561,244 A   10/1996 Olesky et al.
(Continued)

FOREIGN PATENT DOCUMENTS

CN    102735457 A    10/2012
CN    104132818 A    11/2014

OTHER PUBLICATIONS

Office Action dated May 5, 2020 in corresponding Indonesian Application No. PID201704542.
(Continued)

*Primary Examiner* — Yaritza Guadalupe-McCall
(74) *Attorney, Agent, or Firm* — Studebaker & Brackett PC

(57) ABSTRACT

A vehicle wheel alignment system and method is provided for performing a rolling wheel axis of rotation and wheel spindle point calculation every time an alignment is performed. Embodiments include an aligner having a target fixedly attachable to a wheel of the vehicle; a camera for viewing the target and capturing image data of the target; and a data processor. The data processor receives the image data from the camera, and determines a vector pointing from the target origin to a wheel spindle point based on the captured target image data, when the vehicle is rolled while the wheel is on a substantially flat surface such that the wheel and target rotate a number of degrees. The data processor is further adapted to calculate an alignment parameter for the vehicle based at least in part on the wheel axis of rotation and the coordinates of the wheel spindle point.

17 Claims, 9 Drawing Sheets

Related U.S. Application Data continuation of application No. 15/961,068, filed on Apr. 24, 2018, now Pat. No. 10,365,095, which is a continuation of application No. 14/990,271, filed on Jan. 7, 2016, now Pat. No. 9,982,998.

(60) Provisional application No. 62/100,761, filed on Jan. 7, 2015.

(52) U.S. Cl.
CPC ...... *G01B 2210/20* (2013.01); *G01B 2210/26* (2013.01); *G01B 2210/30* (2013.01)

(58) Field of Classification Search
CPC .............. G01B 2210/28; G01B 11/275; G01B 2210/12; G01B 2210/20; G01B 2210/26
USPC .......................................................... 33/228
See application file for complete search history.

(56) References Cited

U.S. PATENT DOCUMENTS

| | | | |
|---|---|---|---|
| 5,724,743 A | 3/1998 | Jackson | |
| 5,809,658 A | 9/1998 | Jackson et al. | |
| 6,134,792 A | 10/2000 | January | |
| 6,195,900 B1 | 3/2001 | Boess | |
| 6,219,134 B1 | 4/2001 | Voeller et al. | |
| 6,412,183 B1 | 7/2002 | Uno | |
| 6,532,062 B2 | 3/2003 | Jackson et al. | |
| 6,710,866 B1 | 3/2004 | Adolph | |
| 6,931,340 B2 | 8/2005 | Jackson et al. | |
| 6,959,253 B2 | 10/2005 | Jackson et al. | |
| 7,313,869 B1 | 1/2008 | Rogers | |
| 7,869,018 B2 | 1/2011 | Strege et al. | |
| 7,974,806 B1 | 7/2011 | Burns et al. | |
| 8,033,028 B2 | 10/2011 | Stieff et al. | |
| 8,136,259 B2 | 3/2012 | Torri et al. | |
| 8,215,023 B2 | 7/2012 | Stieff et al. | |
| 8,457,925 B1 | 6/2013 | Stieff et al. | |
| 9,982,998 B2 | 5/2018 | D'Agostino et al. | |
| 10,365,095 B2* | 7/2019 | D'Agostino | ....... G01B 11/2755 |
| 2005/0060899 A1 | 3/2005 | Jackson et al. | |
| 2006/0126966 A1 | 6/2006 | Strege et al. | |
| 2007/0068016 A1 | 3/2007 | Stieff et al. | |
| 2009/0027662 A1 | 1/2009 | Rogers et al. | |
| 2009/0031782 A1 | 2/2009 | Jackson et al. | |
| 2009/0094845 A1 | 4/2009 | Samuelsson | |
| 2011/0052041 A1 | 3/2011 | Nobis et al. | |
| 2013/0307967 A1 | 11/2013 | D'Agostino et al. | |
| 2014/0111645 A1 | 4/2014 | Shylanski et al. | |
| 2014/0253909 A1 | 9/2014 | McClenahan et al. | |
| 2014/0259707 A1 | 9/2014 | Jones et al. | |
| 2014/0278226 A1 | 9/2014 | Stieff et al. | |
| 2016/0178359 A1 | 6/2016 | Minor et al. | |
| 2016/0195388 A1 | 7/2016 | D'Agostino et al. | |
| 2017/0097229 A1 | 4/2017 | Rogers et al. | |
| 2018/0053320 A1 | 2/2018 | Kunert et al. | |
| 2018/0238682 A1 | 8/2018 | D'Agostino et al. | |
| 2019/0293415 A1* | 9/2019 | D'Agostino | ....... G01B 11/2755 |

OTHER PUBLICATIONS

Office Action dated Oct. 8, 2019 in corresponding Chinese Application No. 201680004791.2.

Examination Report dated Sep. 25, 2019 in corresponding European Application No. 16735408.3.

Notification of Transmittal of the International Search Report and the Written Opinion of the International Searching Authority for InternationalApplication No. PCT/US2016/012477 dated Mar. 17, 2016.

Office Action dated May 30, 2018 for Korean Patent Application No. 2017-7016939.

Extended European Search Report (EESR) dated Oct. 29, 2018 for Application No. 16 73 54 08.

Chinese Office Action dated Feb. 2, 2019 for Application No. 20168000047912.

Office Action dated Feb. 26, 2021 in corresponding European Application No. 16735408.3.

* cited by examiner

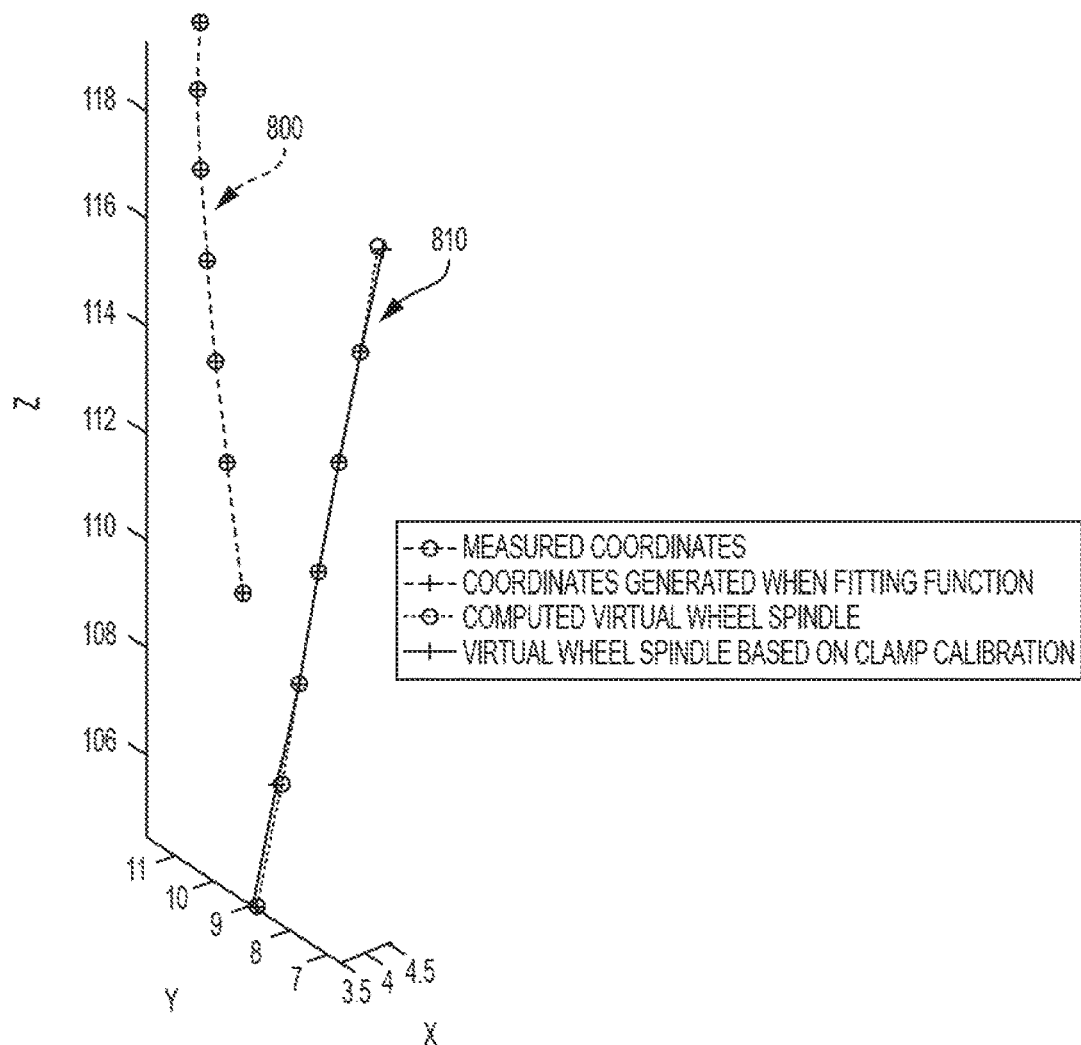
FIG. 8
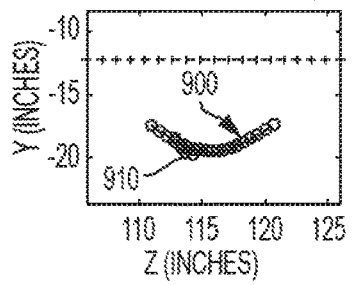
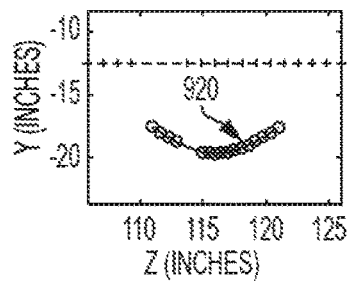
FIG. 9A  FIG. 9B

ROLLING VIRTUAL WHEEL SPINDLE CALIBRATION

FIELD

Embodiments relate generally to systems and methods of automotive wheel alignment. The present subject matter has particular applicability to determining true values of wheel alignment parameters such as camber and toe angles for a vehicle when using an image aligner having targets attached to the vehicle wheels, and cameras to image the targets.

BACKGROUND

Machine vision vehicle alignment systems using movable cameras and targets attached to vehicle wheels, also known as "image aligners," are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one vehicle mounted target viewing camera to another. This type of system is described in U.S. Pat. Nos. 5,535,522; 6,931,340; 6,959,253; and 6,968,282, all of which are hereby incorporated by reference herein in their entirety. An example of a vehicle wheel aligner using such image processing is the Visualiner 3D or "V3D", commercially available from John Bean Company, Conway, Ark., a division of Snap-on Incorporated.

In order to be able to accurately measure wheel alignment angles for a vehicle using an image aligner, the wheel axis of rotation around which the target rotates must be measured, and the coordinates of the virtual wheel spindle point through which the vector passes must be determined.

The conventional method for calibrating the combined system of a target and clamp involves lifting the vehicle off the supporting surface (e.g., the shop floor or an alignment rack) so the wheels with targets mounted are able to rotate freely. The wheels are then rotated to predetermined positions to enable determination of the vector defining the wheel axis of rotation. Since the target origin traverses a circular arc, the coordinates of the center of the circle are computed from points on the circumference of the arc. The center of the circle is on the wheel axis of rotation and is referred to as the virtual wheel spindle point. The virtual wheel spindle point is projected along the wheel spindle axis to the plane of the wheel rim. The projected point is the wheel spindle point. This is illustrated in FIG. 1, wherein a vehicle 100 on whose wheel a clamp 110 carrying a target 120 is mounted. Coordinates are in a target coordinate system. The axis of rotation vector 130 passes through the wheel spindle point 140 and virtual wheel spindle point 150. The target centroid is offset from the virtual wheel spindle point 150.

Typical wheel clamp and target assemblies are manufactured so that calibration processes do not have to be repeated every time a clamp is removed from a wheel. Conventional target assemblies commonly employ self-centering wheel clamps for this purpose. Clamp mounting errors are compensated for by a well-known rolling runout calculation.

A calibration procedure for the system of target and self-centering clamp is typically performed by a technician when an aligner is first set up, using custom calibration equipment. It must be performed thereafter whenever a new target is introduced to the system; for example, when a target is replaced. Disadvantageously, the end user must wait for a service technician or, if they are to perform the calibration procedure themselves, they must have special training. Moreover, in the normal course of use, targets and their associated clamps tend to change their relative geometry (e.g., if a clamp is dropped). While the clamps and targets may still be usable, this change in relative geometry is not reflected in the original system calibration, disadvantageously resulting in a degradation of alignment accuracy over time.

A need exists for a methodology and apparatus to determine the wheel axis of rotation and wheel spindle point that does not require additional time to be taken to lift the vehicle and perform an extra process otherwise unnecessary for a typical alignment. A need also exists for a methodology and apparatus that can adjust for normal wear and tear of wheel target assemblies, to maintain alignment accuracy. Further, a need exists to minimize the cost of wheel clamps by removing the need for self-centering capability.

SUMMARY

The disclosed system and methodology determines the wheel axis of rotation and wheel spindle point every time an alignment is performed, by rolling the vehicle wheels and tracking the motion of the targets attached to the wheels. The disclosed procedure can be performed at the same time as a conventional rolling runout compensation procedure, which is part of the standard wheel alignment process flow, and must be performed near the beginning of an alignment procedure in any event. Also, the present disclosure enables calculation of the wheel spindle point and axis of rotation regardless of where the target is radially located on the wheel, thereby eliminating the need for a self-centering wheel clamp.

More particularly, this disclosure discusses the determination of wheel alignment angles from target pose measurements made when a wheel rolls without slipping. A target placed at a radius between the axle of the wheel and the wheel circumference is tracked by a camera system. Specifically, the origin and the orientation of the target are tracked. Under the ideal circumstances of 2-D motion with no sliding, the trajectory of the target origin traces the path of a curve known as a curtate cycloid as the wheel rolls. The angle of rotation of the wheel is determined from the changing pose of the target.

The virtual wheel spindle point can be computed from the motion of the target origin while the wheel rotates. There is an analytic solution to the problem of computing the motion of the virtual wheel spindle point when three target coordinates and poses are known with no measurement error. The equation of the path taken by the target can be determined by making measurements of the target coordinates and pose, and fitting a model to the data to determine the equation's parameters. The path of the virtual wheel spindle point is computed from the equation's parameters.

One or more embodiments include a wheel alignment method for a vehicle, comprising affixing a target to a wheel of the vehicle, and providing a camera for viewing the target and capturing image data of the target. The vehicle is rolled while the wheel is on a substantially flat surface such that the wheel and target rotate a number of degrees, while the camera captures the image data of the target. The wheel axis of rotation is calculated along with a wheel spindle point based at least in part on the captured image data. The wheel spindle point and the wheel axis of rotation are used to compute an alignment parameter for the vehicle.

Embodiments further include a vehicle wheel alignment system comprising a target fixedly attachable to a wheel of the vehicle; a camera for viewing the target and capturing image data of the target; and a data processor. The data processor is adapted to receive the image data from the camera, and determine a vector pointing from the target origin to a wheel spindle point based at least in part on the image data of the target captured, when the vehicle is rolled while the wheel is on a substantially flat surface such that the wheel and target rotate a number of degrees. The data processor is further adapted to calculate an alignment parameter for the vehicle based at least in part on the wheel axis of rotation and the coordinates of the wheel spindle point.

Embodiments also comprise a non-transitory computer readable medium having instructions stored thereon that, when executed by a processor of a vehicle wheel alignment system, cause the processor to determine an alignment parameter for the vehicle. The alignment system has a target fixedly attachable to a wheel of the vehicle and a camera for viewing the target and capturing image data of the target. The determination comprises receiving the image data from the camera, determining the wheel axis of rotation and the coordinates of the wheel spindle point, based at least in part on the image data of the target captured when the vehicle is rolled while the wheel is on a substantially flat surface such that the wheel and target rotate a number of degrees, and calculating the alignment parameter for the vehicle based at least in part on the wheel axis of rotation and the coordinates of the wheel spindle point.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIG. 8 is a graph showing an improved agreement between the virtual wheel spindle point coordinates determined by fitting coordinate data to the virtual wheel spindle point coordinates computed according to various embodiments.

FIGS. 9A-9B are graphs showing outlying data points detected after fitting a curtate cycloid to measured data according to various embodiments.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Figure 10:
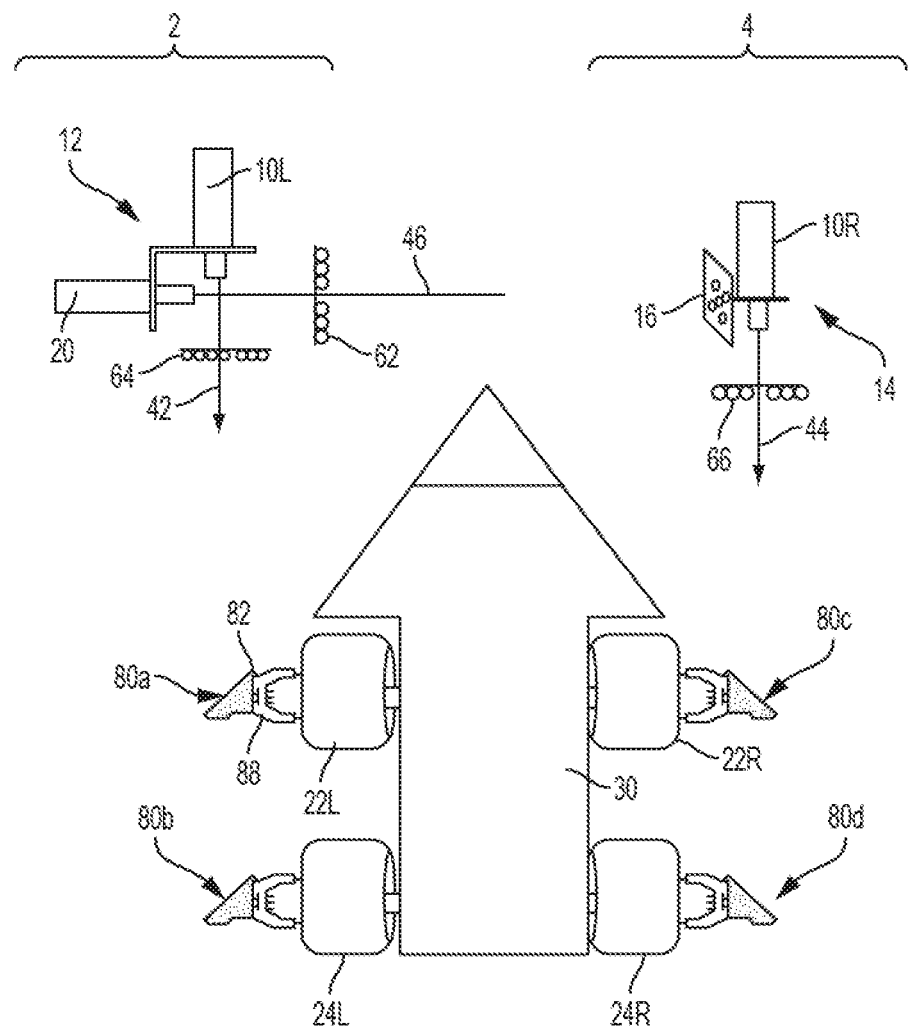
FIG. 10 is a schematic top plan view of a self-calibrating wheel alignment system with which the disclosed system and methodology can be implemented.

Disclosed herein are methods and systems for wheel axis vector calculations. FIG. 10 is a schematic top plan view of certain elements of a computer-aided, 3D motor vehicle wheel alignment system ("aligner"), such as disclosed in U.S. Pat. No. 6,968,282 discussed herein above. This aligner has elements in common with the presently disclosed aligner, and can be used to implement the disclosed techniques. In particular, the aligner of FIG. 10 comprises a left camera module 2 and a right camera module 4 that are used to align wheels of a motor vehicle. The terms "left" and "right" are used for convenience, and are not intended to require a particular element to be located in a particular location or relationship with respect to another element.

Arrow 30 of FIG. 10 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 24L, 22R, 24R, respectively. Each alignment target generally comprises a plate 82 on which target information is imprinted and a clamping mechanism 88 for securing the target to a wheel. A left camera module 2 comprises left alignment camera 10L. Left alignment camera 10L faces the vehicle and views the left side targets 80a, 80b along axis 42. Right camera module 4 comprises a right camera 10R that faces the vehicle and views the right side targets 80c, 80d along axis 44. Left camera module 2 also includes a calibration camera 20 mounted perpendicularly to camera 10L via a bracket 12. Calibration camera 20 views a calibration target 16 attached to right camera module 4 via bracket 14 along axis 46, to determine the positions of alignment cameras 10L, 10R relative to each other. Each camera 10L, 10R, 20 has an illumination source 62, 64, 66.

The disclosed aligner further comprises a data processor (not shown), such as a conventional personal computer (PC), having software with instructions to cause the data processor to perform the calculations described herein electronically.

Figure 11:
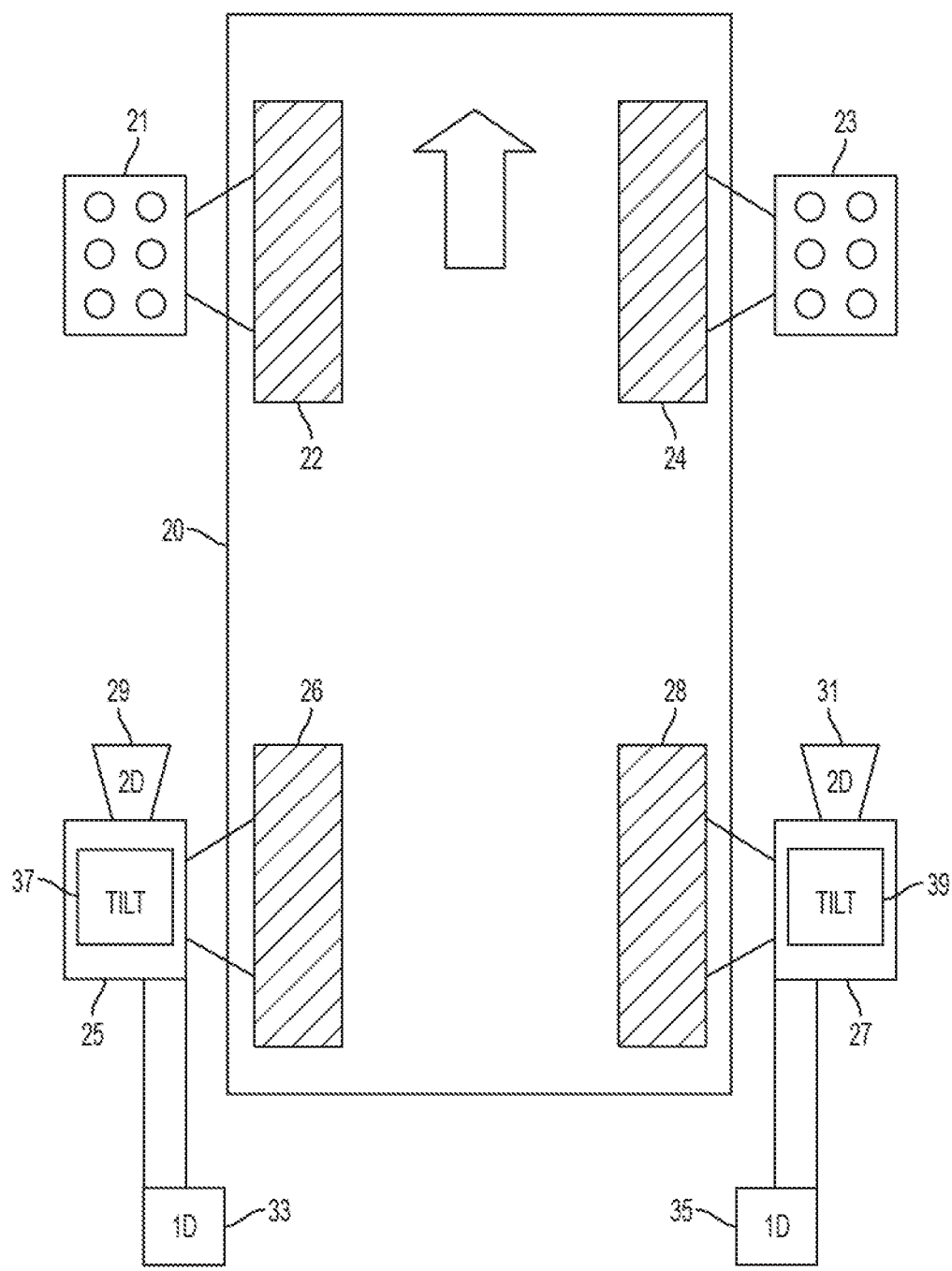
FIG. 11 is a schematic top plan view of a hybrid wheel alignment system with which the disclosed system and methodology can be implemented.

The method and apparatus described herein is also applicable for use with a hybrid aligner system as described in U.S. Pat. No. 7,313,869, which is hereby incorporated by reference in its entirety, and its continuation patents. FIG. 11 shows a schematic representation of an exemplary hybrid aligner system useable with the presently disclosed method and apparatus, including a pair of passive targets 21 and 23 mounted on respective wheels 22 and 24 of the vehicle, which are front steering wheels in this first example. A pair of active sensing heads 25 and 27 are adapted for mounting in association with other respective wheels 26 and 28 of the vehicle, in this case the rear wheels. Each active sensing head includes a camera 29 or 31 for producing 2D image data, which is expected to include an image of one of the targets 21, 23 when the various heads are mounted to the respective wheels of the vehicle. The system also uses two conventional (1D) angle sensors 33 and 35 to measure the relative angles of the active sensing heads 25 and 27 in the toe plane, and a pair of tilt sensors 37, 39 to measure tilt, typically camber and pitch, of heads 25, 27.

Definitions

Target Coordinate System: The coordinate system defined by the geometry of a target.

Target Origin: The mathematical point defined to be the origin of the target coordinate system.

Wheel Axis of Rotation: The axis about which the wheel rotates. Also known as the wheel spindle axis.

Wheel Rim Plane: The plane defined by the wheel rim outer surface.

Virtual Wheel Spindle Point: point along the axis of rotation of the wheel around which the target origin rotates.

Wheel Spindle Point: point at which the axis of rotation of the wheel intersects the wheel rim plane.

Target Radius: distance between the target origin and the virtual wheel spindle point.

Camera tilt angle: tilt angle of the camera relative to the direction of motion of the wheel spindle.

Starting roll angle: angular location on the wheel where the target origin is located when the roll starts.

Jacked Wheel Spindle Calibration: the process for or result of computing the wheel axis of rotation and virtual wheel spindle point from measurements made while the wheel is raised so it can rotate freely without linear motion.

Rolling Wheel Spindle Calibration: the process for or result of computing the wheel axis of rotation and virtual wheel spindle point from measurements made while the wheel is rolling.

The disclosed rolling wheel spindle calibration techniques provide several distinct advantages over the conventional jacked wheel spindle calibration procedure. One advantage is that rolling wheel spindle calibration is an "online" rather than an "offline" process. Rolling wheel spindle calibration is performed every time rolling runout compensation is performed, which is part of the standard wheel alignment process flow. Unlike jacked wheel spindle calibration, there is no special procedure that must be followed and there is no special training the end-user must have to perform this system calibration. As a result, a trained field service representative with custom calibration equipment is not needed to perform high accuracy system calibrations. This saves the end user time and money.

Another advantage of being an online process is that true wheel spindle calibration changes over time. In the normal course of use, targets and clamps tend to change their relative geometry (e.g., when clamps are accidentally dropped). There is nothing wrong with this change in relative geometry; all that matters is that the relative geometry is accurately reflected in the wheel spindle calibration. As an online measurement, rolling wheel spindle calibration provides the most up-to-date measurement of the wheel spindle point coordinates and wheel axis of rotation orientation.

Another advantage of rolling wheel spindle calibration is experienced when employing vehicle-centric wheel alignment coordinate systems. In conventional vehicle-centric coordinate systems, a coordinate system is constructed based upon measurements of a vehicle under examination, typically, using the centers of the vehicle's wheel rims. When the disclosed rolling wheel spindle calibration is employed, one does not assume a fixed spatial relationship between the target and the wheel rim centers. The centers of the wheel rims are computed as part of the process. As a result, the target can be placed at any relative radial position with respect to the wheel axis. In other words, the target can be affixed to the wheel such that the target origin is disposed substantially on the axis of rotation of the wheel, or such that the target origin is offset from the wheel axis of rotation. The disclosed rolling wheel spindle calibration techniques thus provide freedom in the type of targets used.

Overview

The purpose of a wheel spindle calibration measurement is to determine the location of the wheel spindle point relative to the target for all positions and orientations of the wheel to which the target is attached. The wheel spindle point is a point at the intersection of the axis of rotation of the wheel and the plane defined by the outward face of the rim of the wheel. The origin of the target coordinate system is typically referred to as the target origin. Determining the location of the wheel spindle point along with the direction of the wheel axis of rotation is an integral part of determining wheel and frame alignment, as those of skill in the art will appreciate.

The measureable quantity for any position of the wheel is the target origin and the orientation of its pose. The wheel axis of rotation is computed from the change to the orientation of the pose of the target as the wheel is rotated. The coordinates of the wheel spindle point in the target coordinate system is invariant as the wheel is rotated.

Figure 1:
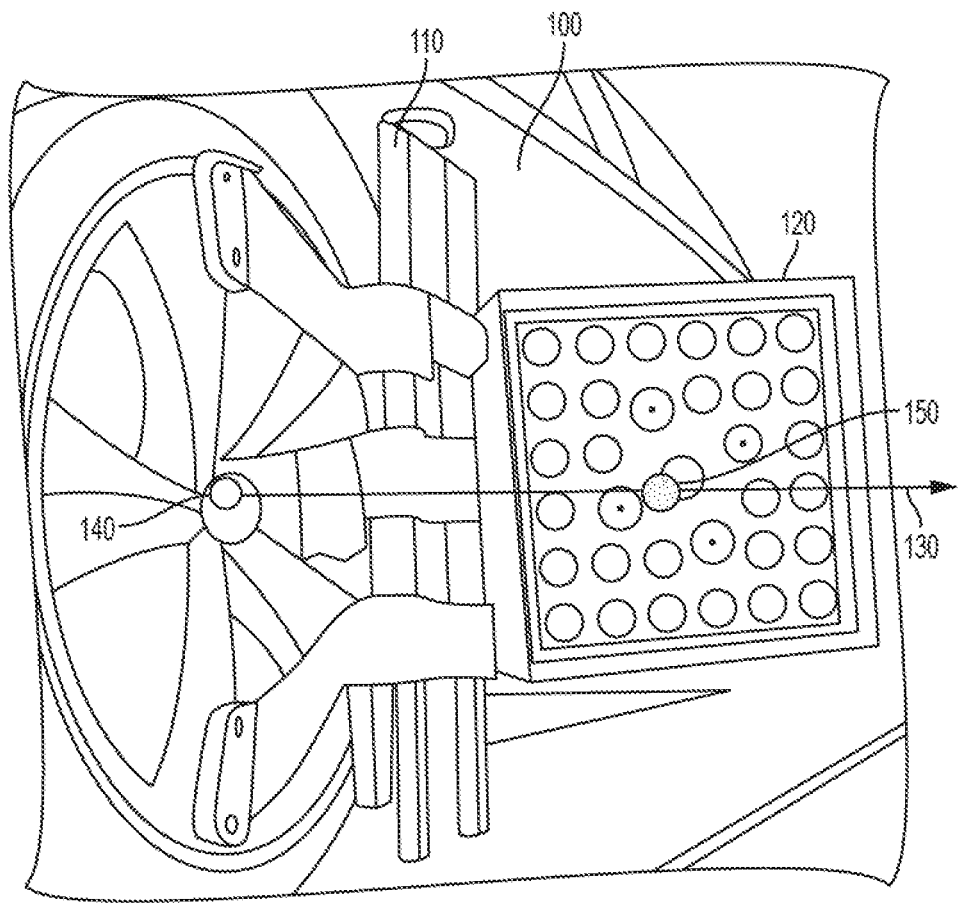
FIG. 1 is a perspective view of a vehicle with a clamp/target assembly attached, illustrating the virtual wheel spindle point, the wheel spindle point and wheel axis of rotation.
Figure 2:
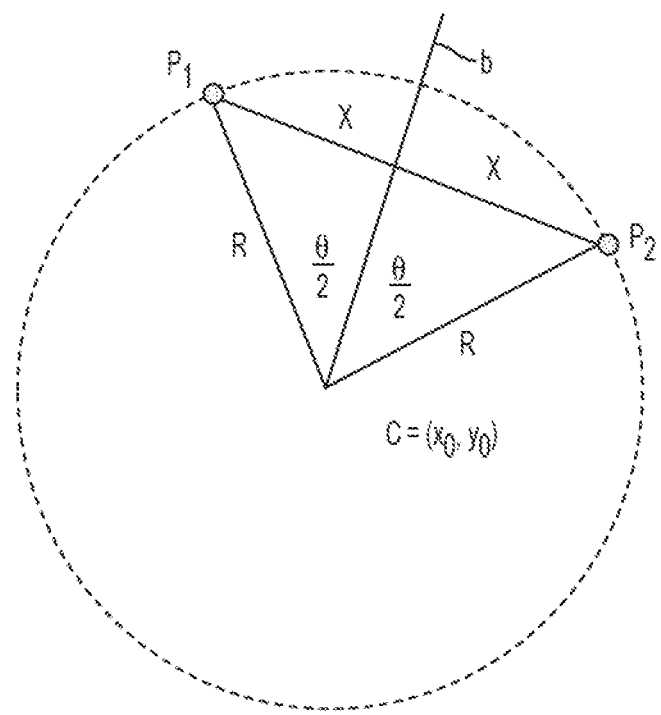
FIG. 2 is a diagram illustrating an example of how the coordinates of a virtual wheel spindle point in the plane of motion of the target origin are computed when the wheel is free to rotate according to various embodiments.

The conventional procedure for determining the wheel spindle point and wheel axis of rotation is to lift the vehicle so the wheels are free to rotate. Each wheel is then rotated to at least two positions while observing the target attached to the wheel and measuring the target pose. Measurement of the target pose along with the coordinates of the target origin at the two positions allows for the calculation of the rotation angle between the target poses, the vector defining the wheel axis of rotation, the target radius, and the virtual wheel spindle point. The geometry is shown in FIG. 2, wherein:

X: ½ the chord length between the measured points

θ: The angle of rotation of the target $P_1$, $P_2$: Measured coordinated of target centroid C: center of circle with coordinated ($X_0$, $Y_0$)

The plane defined by the target origin as it rotates around the wheel axis of rotation is parallel to the plane defined by the face of the wheel rim in which the wheel spindle point is located. The distance between these two planes is called the target offset distance and is determined by the clamp geometry. This distance is used to compute the coordinates of the wheel spindle point relative to the target origin.

Raising the vehicle, rotating the wheels while making measurements, and lowering the vehicle are error prone, time consuming, labor intensive and expensive processes that users seek to avoid. Using the conventional procedure described immediately above, lifting the vehicle is required every time the combined system of a target and its clamp need to be calibrated. Systems using self-centering clamps are used in combination with targets and calibrated once for use on subsequent vehicles. The important feature of self-centering clamps is they can be placed on wheels such that the relative target to virtual wheel spindle point translation is fixed. But self-centering clamps impose undesirable size, appearance, and cost constraints.

Both the cost of lifting the vehicle and the cost of self-centering clamps makes it desirable to develop an alternative method to perform wheel spindle calibration without needing to raise the vehicle. It is advantageous to compute the wheel spindle point and wheel axis of rotation while the vehicle wheels roll without slipping on the ground. This is already part of the process for computing wheel alignment (e.g., conventional rolling runout compensation) and does not require a special calibration step in the process. An advantage of the disclosed rolling wheel spindle calibration is that the clamp/target system is not required to have a fixed self-centering geometry. The requirement for calibrating such a system with each use means only a simple calibration procedure is needed.

Calibrating a Raised Wheel

When the wheel is raised and rotated, a target located at a radial distance from the wheel axis of rotation (virtual wheel spindle point) traces out a circle. The radius and location of the virtual wheel spindle point can be computed from two target coordinates and the angle of rotation or central angle between them. This is illustrated in FIG. 2 as follows:

1. The wheel axis of rotation is normal to the plane in which the two measured points $P_1$, $P_2$ and the center of rotation lie.

2. The wheel axis of rotation is on the perpendicular bisector b of the chord between the two measured points $P_1$, $P_2$.

3. The length (2x) of the chord is known.

4. The perpendicular bisector b of the chord bisects the known angle $\theta$ between the two measured points $P_1$, $P_2$.

First, solve for the radius R in terms of $\theta$ and x. Then solve for the intersection of the two circles with radius R centered at $P_1$ and $P_2$. There are two solutions for the center of the circle, but only one solution falls on the correct side of the line between $P_1$ and $P_2$.

Rolling Wheel Spindle Calibration

Figure 3:
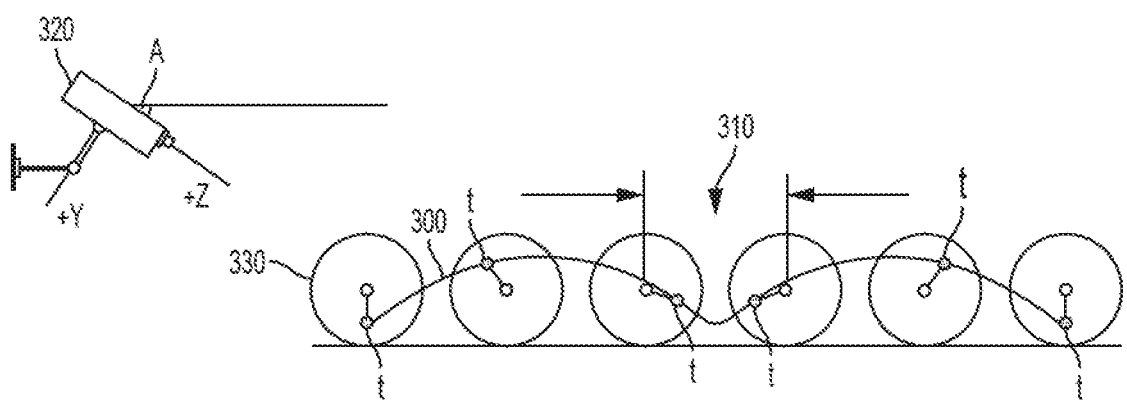
FIG. 3 is a diagram illustrating the path of a target when a vehicle wheel to which the target is attached is rolling.

Calibration of a rolling wheel spindle according to the present disclosure will now be described. When the wheel is rolling without slipping while in contact with the ground, a target traces out a curtate cycloid. As shown in FIG. 3, the path 300 of the target origin t denotes a curtate cycloid. For practical reasons, only a small portion of the path 300; e.g., a 90 degree range of motion 310, is measured. The measurement range 310 is limited because the camera 320 always needs to view the face of the target (not shown, but can be similar to target 120). The center of rotation of the wheel 330 and its direction of motion is not a measured feature. The measurement of the position and orientation of the target use single perspective n-point pose estimation. At each target position, both the coordinates and orientation of the target is computed. The direction of the wheel axis of rotation around which rotation occurs is computed from the change in pose.

Measurements made in a two dimensional plane consist of three coordinate measurements with a pose measurement made at each position. From these measurements the following parameters are computed:

1. Diameter of wheel 330;
2. Target radius;
3. Starting position of wheel 330 relative to the camera 320 (X, Y, Z coordinates);
4. Rotational angle of the target while attached to the wheel 330 at its starting position;
5. The camera's tilt angle A or direction of travel of the wheel 330 relative to horizontal as defined by the camera axis.

Figure 4:
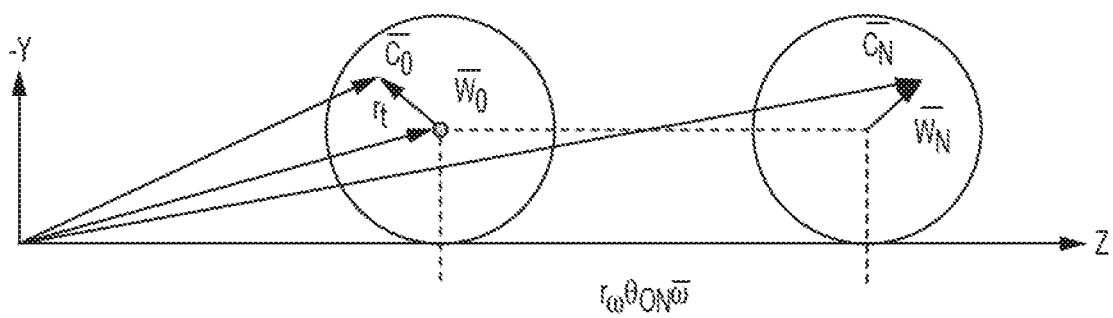
FIG. 4 is a diagram describing the geometry of a rolling wheel with a target attached, including parameters used in an exemplary derivation of the initial virtual wheel spindle point coordinates according to various embodiments.

The parameters of a curtate cycloid in a plane are exactly solvable from three measured points and the angular differences between them. FIG. 4 shows the geometry of a rolling wheel with a target attached at radius $r_t$, and describes a derivation of the initial wheel spindle coordinate, wherein:

$$\overline{C}_N = \overline{W}_O + r_\omega \theta_{ON} \overline{\omega} + R_{ON}(\overline{C}_O - \overline{W}_O)$$

$r_t$: target radius
$R_{ON}$: rotation matrix rotates $(\overline{C}_O - \overline{W}_O)$ into $(\overline{C}_N - \overline{W}_N)$
$r_\omega \theta_{ON}$: linear travel of wheel
$\overline{\omega}$: vector specifying direction of linear travel
I: identity matrix A bar over a variable signifies the variable is a vector. The equation $$\overline{W}_0 = \left(I - R_{01} - \frac{\theta_{01}}{\theta_{02}}(I - R_{02})\right)^{-1} \left((\overline{C}_1 - R_{01}\overline{C}_0) - \frac{\theta_{01}}{\theta_{02}}(\overline{C}_2 - R_{02}\overline{C}_0)\right) \quad (1)$$

computes the coordinates of the initial wheel spindle points as a function of the coordinates of the target origin and rotation angle. The wheel spindle point coordinates for every position of the target can also be computed given the initial wheel spindle point coordinate, the direction of travel, and the rotation angle.

It should be noted the disclosed rolling wheel spindle calibration technique can also handle the case of a raised wheel. Any linear travel of the wheel is defined by the term $r_\omega \theta_{ON}$. When this term is set to zero in the implementing software, all of the data points lie on the circumference of a circle. The software then proceeds to compute the stationary wheel spindle point $W_O$ and the target radius.

Data Pre-Processing

The measured data points are sorted in order of increasing Z coordinate. As a result, it does not matter whether a wheel is rolled forward or backward in the disclosed techniques. The order of the measured angular differences in the changing target pose is defined by the sorting. With regards to the 3-pt formula, the initial wheel spindle point coordinate $W_O$ is closest to the camera. The simulated data generated during the non-linear least squares search described herein below uses the angular differences extracted from the measured data.

Estimation of rolling parameters of a wheel is essentially a 2-dimensional problem with small deviations of the motion of the target origin from a 2-dimensional plane because of noise and a small helical motion because of vehicle toe. The trajectory of the wheel can be thought of as having roll, pitch, and yaw relative to the camera. The roll and yaw parameters can be computed in advance, leaving an unknown pitch in the data. The pitch corresponds to any downward view of the camera relative to the linear motion of the wheel, and in this document is referred to as the camera tilt angle (denoted by reference character A in FIG.

3). Roll corresponds to camera rotation, and yaw any left-right orientation of the camera relative to the linear motion of the wheel.

Figure 5A:
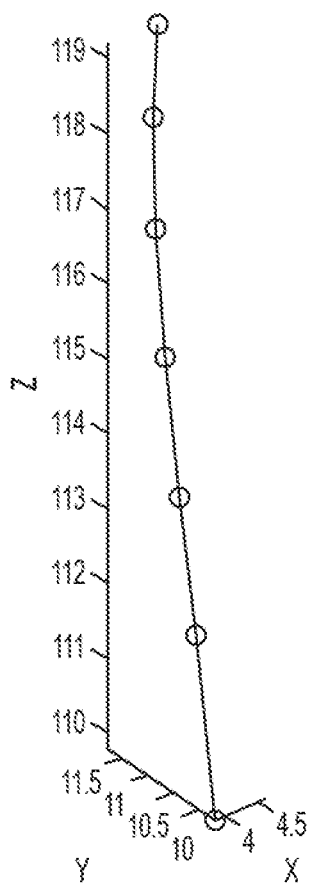
FIGS. 5A-5B are graphs showing rotation of 2-D target pose data into the Y-Z plane during preprocessing according to various embodiments.
Figure 5B:
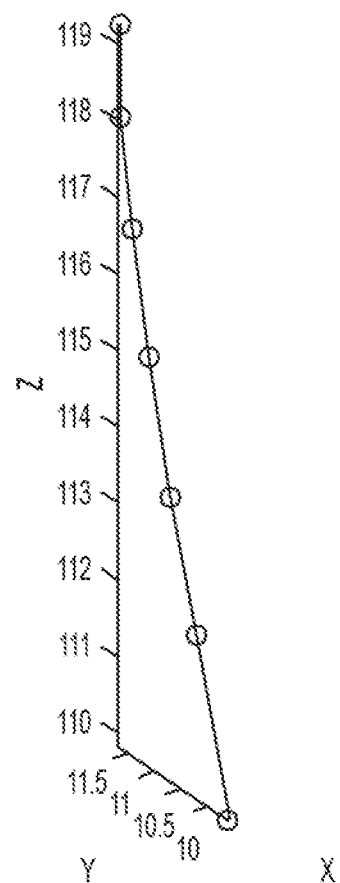
Figure 6A:
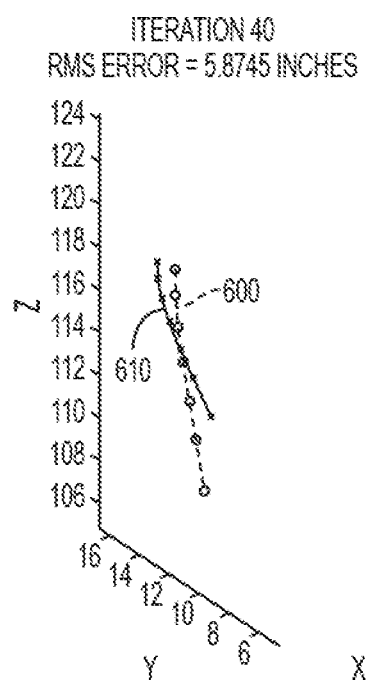
FIGS. 6A-6D are graphs showing fitting iterations as parameters are adjusted in a nonlinear least squares fit calculation according to various embodiments.
Figure 6B:
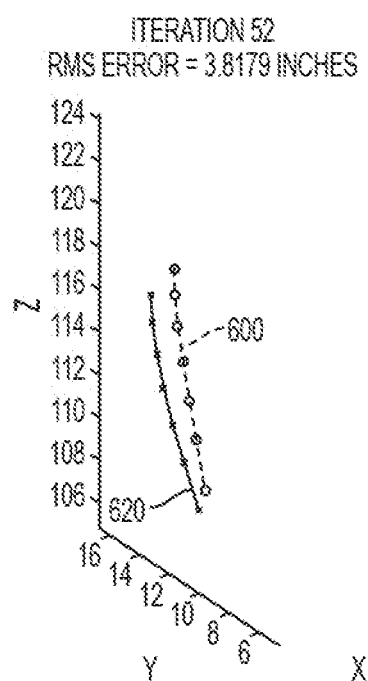
Figure 6C:
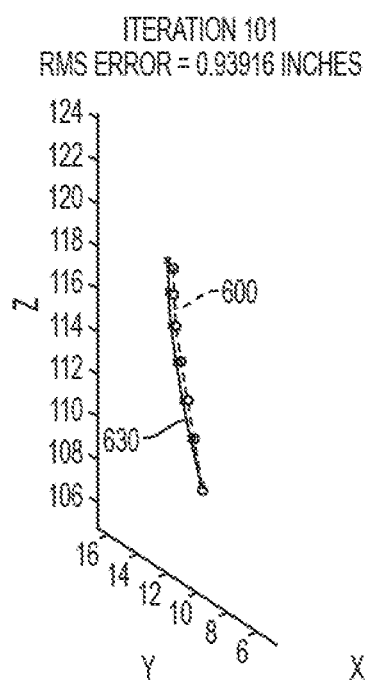
Figure 6D:
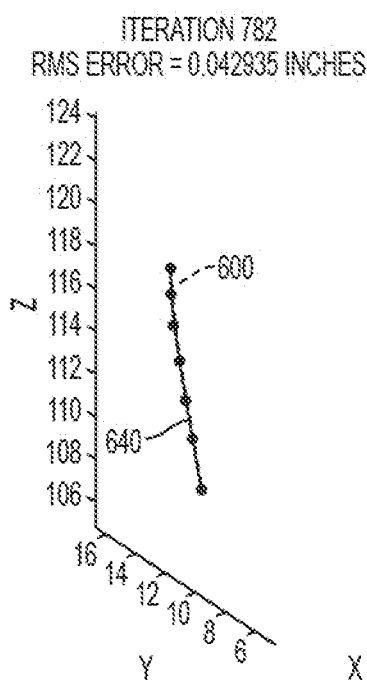

Roll and yaw can be determined from the axis of rotation of the target measured from pose to pose. FIGS. 5A-B show the rotation of the data into the Y-Z plane during preprocessing. The Y-Z plane is defined by the camera coordinate system. The data in FIG. 5A is translated and rotated to lie in the Y-Z plane for processing in FIG. 5B. Pre-processing removes some of the computational burden of the problem for both a three-point fit and a non-linear fit.

Nonlinear Least Squares Search for Parameters

For practical reasons, more than three pose measurements may be needed to perform the disclosed rolling wheel spindle calibration. As a skilled artisan would understand, measurement noise can affect image processing, the vehicle may not move in a straight line (the wheels may be turned), the platform the vehicle rolls on may include bumps, and/or the platform the vehicle rolls on may slide so the wheels may not undergo pure rotation. Alternatively, the wheel may bump slightly because of a gap between the plate and the platform. In addition, the range of motion of the vehicle may be limited by mechanical constraints. One result of these complexities is that the three pose solution may be prone to error. The disclosed techniques therefore include more data points, and fitting the parameterized curve of a curtate cycloid to the measured data. In this way, the data can be processed to detect and compensate for unexpected motion and other complexities.

According to certain embodiments, if more than three measured points are acquired during the vehicle roll, a well-known least squares fitting approach is taken to process the data (with only three points, the solution is exact). The following can disadvantageously affect results:

1. As the wheel rolls from one position to the next the wheel can turn slightly. If there are more than three points, the measured points may not lie in a plane. Also, the direction of the wheel axis of rotation will vary.

2. As the wheel rolls from one position to the next it may encounter bumps or slide without rolling.

3. The wheel may not be perfectly round, and it is not understood how the wheel deformation affects the motion of the target.

4. Tire treads may induce variation in the motion of the target.

5. There may be errors in the pose angle measurements of the targets, generating errors in the estimated angular rotation of the wheel.

For these reasons, a numerical optimization method is implemented by this disclosure to estimate the wheel parameters and wheel spindle positions during rolling. The numerical optimization method minimizes the error between the measured data and simulated data by adjusting model parameters. The model parameters include wheel diameter, target radius, the direction of linear motion of the wheel relative to the camera axis, and the starting position of the wheel relative to the camera. The model parameters are then used to compute the locations of the wheel spindle point as the wheel rolls. The wheel spindle points and wheel axis of rotation are then computed using the measured pose coordinates and orientation.

In some embodiments, the well-known Nelder-Mead optimization method is used to determine the model parameters by minimizing the aggregate RMS error, defined as the difference between the measured target coordinates and the simulated model coordinates. The method performs a nonlinear least squares fit of the simulated data to the measured data. FIGS. 6A through 6D show four iterations of the fitting process as the error is minimized, wherein the measured data is denoted by reference numeral 600 and the coordinates generated by the fitting function are denoted by reference numerals 610-640. The parameters which can be adjusted include the wheel diameter, the target radius, closest position of the wheel during its roll, orientation of the target at its closest position, the camera's orientation relative to the direction of travel.

The parameters which are varied during the fitting process are:

1. Wheel Spindle Y-coordinate.
2. Wheel Spindle Z-coordinate.
3. The direction of the wheel is moving relative to the camera axis (i.e., camera tilt angle).
4. Angular position of the target at the start of the roll.
5. The radius of the target origin relative to the wheel axis of rotation.
6. The wheel diameter.

Figure 7:
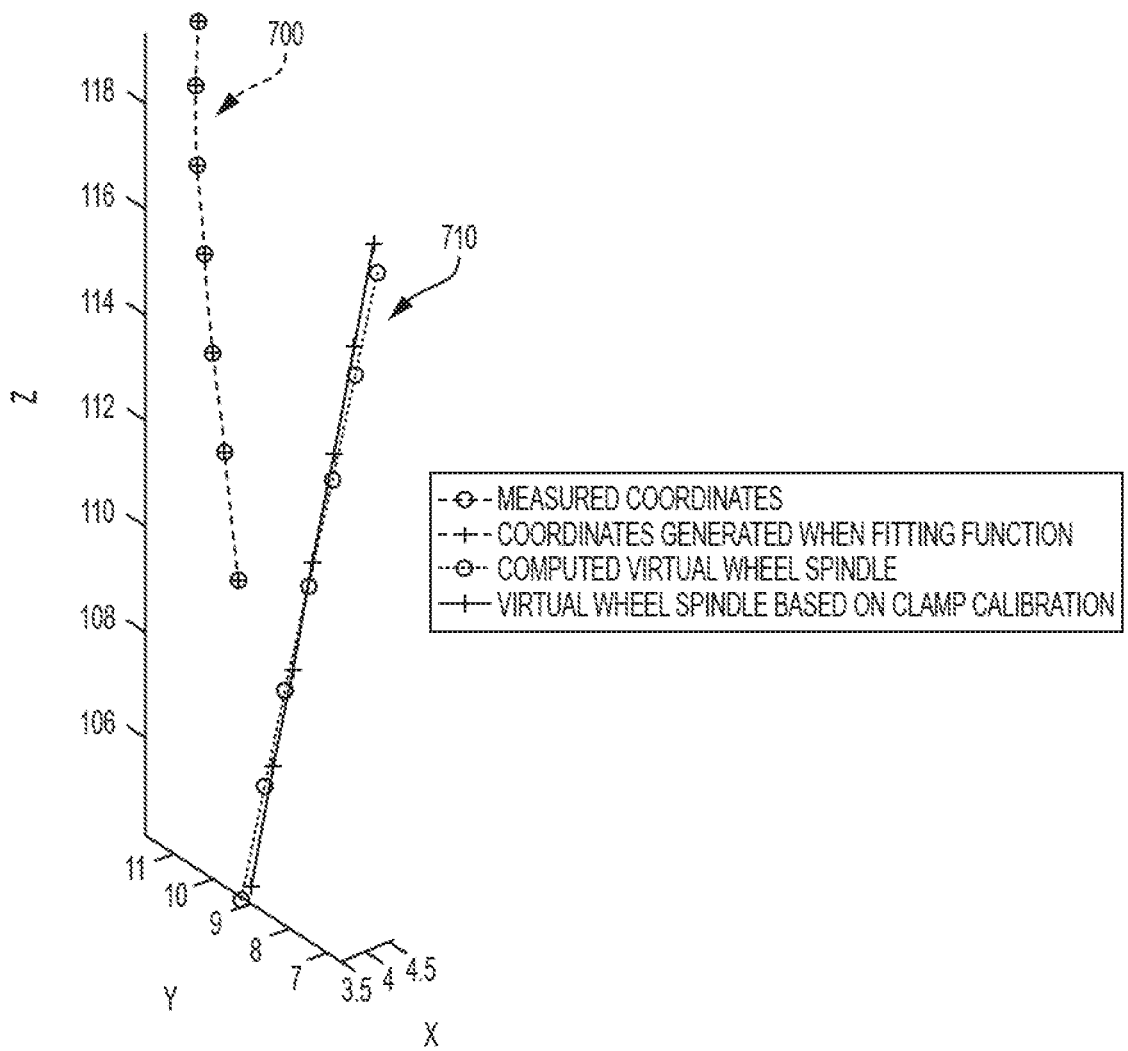
FIG. 7 is a graph showing measured coordinates of the target origin and virtual wheel spindle point coordinates according to various embodiments.

The fitting of a curtate cycloid to the measured data is sensitive to noise. The fitting algorithm always converges and provides the correct wheel spindle coordinates, wheel diameter and radius for simulated data where the added noise is random. With real data, the parameters will adjust to minimize the aggregate error, but the result can include errors in the parameters. An error will appear as a shift in the location and direction of the wheel spindle coordinates relative to the target coordinates. This shift is seen in FIG. 7 as a difference between the virtual wheel spindle point coordinates 700 computed from the fit, and the virtual wheel spindle point coordinates 710 determined by the calibrated target/clamp system (i.e., based on clamp calibration during rolling).

FIG. 8 shows improved agreement between the virtual wheel spindle point 800 determined by fitting the coordinate data, and the reference virtual wheel spindle point 810 determined when using a self-centering clamp. In this embodiment, higher order terms were added to the model to account for motion of the wheel which was not exactly proportional to its rotational motion. These additional terms improved the fitting error and the error in the wheel spindle point coordinates. Fitting the target origin coordinates to a model may not be sufficiently robust in an unconstrained environment with sliding and rotating platforms.

One solution is to remove degrees of freedom from the measurement. One method is to use a clamp which, while not self-centering, positions the target origin close to the wheel axis of rotation.

Another method is to augment the target measurements with another measurement that defines the direction of wheel axis of rotation travel. An example is a target pattern visible on the floor so the pose of the floor was known. Other examples include a marker attached to the vehicle body while it is moved, or a signal from an electronic level attached to the target. This additional measurement removes the camera tilt angle as an unknown parameter.

Alternative Methods for Computing Rolling Wheel Spindle Calibration

To compute rolling wheel spindle calibration, one need not use the Nelder-Mead simplex algorithm described in the embodiment above. Those of skill in the art will appreciate that one could compute rolling wheel spindle calibration via analytical parameter models including gradient descent, Levenberg-Marquardt, and other iterative nonlinear least squares methods. The class of algorithms collectively known as "grid search" algorithms constitutes another set of usable alternatives. Grid search algorithms are non-parametric parameter estimation algorithms typically employed where the optimization process is not guaranteed to occur in a purely convex space. These are several alternative methods which could be employed in other embodiments in lieu of the Nelder-Mead simplex algorithm.

Removal of Outliers

The trajectory of the curtate cycloid traced out by target origin is a smooth arc. A bump in the wheel motion may be detected as an outlier in the data. In certain embodiments illustrated by FIGS. 9A-9B, outlier detection is accomplished by performing an initial fit of a curtate cycloid to the data (FIG. 9A). If the aggregate error is large, a decision is made to remove the data point 910 with the largest error and iterate the process until the error is small (see, fit 920 of FIG. 9B). This process of generating a fit to the data and removing outliers can be run repeatedly until the aggregate error falls below a threshold and there are sufficient remaining points.

As pointed out previously, the standard required rolling runout compensation procedure can be performed at the same time as the disclosed wheel spindle calibration, based at least in part on the image data captured when the vehicle is rolled to determine the wheel spindle point coordinates and wheel axis of rotation direction vector. An exemplary technique for determining rolling runout is described in above-discussed U.S. Pat. No. 5,535,522 at col. 12:5-30. Those of skill in the art will appreciate that other conventional rolling runout techniques can be employed. The wheel spindle point coordinates and wheel axis of rotation direction vector and the rolling runout calculation can both be used to calculate an alignment parameter for the vehicle; e.g., toe, camber, etc. in a conventional manner.

Embodiments of a method, system and computer program product for rolling wheel spindle determination may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for rolling wheel spindle determination.

Furthermore, embodiments of the disclosed method, system, and computer program product for rolling wheel spindle determination may be readily implemented, fully or partially, in software using, for example, object or object-oriented software development environments that provide portable source code that can be used on a variety of computer platforms. Alternatively, embodiments of the disclosed method, system, and computer program product for rolling wheel spindle determination can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for rolling wheel spindle determination can be implemented in hardware and/or software using any known or later developed systems or structures, devices and/or software by those of ordinary skill in the applicable art from the functional description provided herein and with a general basic knowledge of the computer and/or wheel alignment arts.

It is, therefore, apparent that there is provided in accordance with the present invention, a method, system, and computer program product for performing a rolling wheel spindle determination. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method comprising:
affixing a target to a wheel of the vehicle;
providing a camera for viewing the target and capturing image data of the target;
rolling the vehicle such that the wheel and target rotate while the camera captures the image data of the target;
calculating a wheel axis of rotation based at least in part on the captured image data;
calculating a virtual wheel spindle point in the plane of motion of the target origin around which the target origin revolves, based at least in part on the captured image data; and
using the virtual wheel spindle point and wheel axis of rotation to calculate a direction of travel of the wheel.

2. The method of claim 1, comprising calculating a wheel spindle point based at least in part on the captured image data and using the wheel spindle point to calculate an alignment parameter for the vehicle.

3. The method of claim 1, comprising calculating a rolling runout of the wheel based at least in part on the captured image data, and using the rolling runout calculation to calculate the alignment parameter for the vehicle.

4. The method of claim 1, comprising calculating the virtual wheel spindle point using an iterative nonlinear least squares technique.

5. The method of claim 4, wherein the iterative nonlinear least squares technique comprises one of a Nelder-Mead simplex algorithm, a Levenberg-Marquardt algorithm, and a gradient descent algorithm.

6. The method of claim 1, comprising calculating the virtual wheel spindle point using a grid search algorithm.

7. The method of claim 1, comprising affixing the target to the wheel such that the target origin is offset from the wheel axis of rotation.

8. The method of claim 1, comprising affixing the target to the wheel such that the target origin is disposed substantially on the wheel axis of rotation.

9. A system comprising:
a target fixedly attachable to a wheel of the vehicle;
a camera for viewing the target and capturing image data of the target; and
a data processor adapted to:
receive the image data from the camera,
determine a wheel axis of rotation based at least in part on the image data of the target captured when the vehicle is rolled such that the wheel and target rotate;
determine a virtual wheel spindle point, based at least in part on the image data of the target captured when the vehicle is rolled, and
calculate a direction of travel of the wheel based at least in part on the wheel axis of rotation and the virtual wheel spindle point.

10. The system of claim 9, comprising calculating a wheel spindle point based at least in part on the captured image data and using the wheel spindle point to calculate an alignment parameter for the vehicle.

11. The system of claim 9, wherein the data processor is adapted to calculate a rolling runout of the wheel based at least in part on the captured image data, and calculate an alignment parameter for the vehicle based at least in part on the rolling runout.

12. The system of claim 9, wherein the data processor is adapted to calculate the virtual wheel spindle point coordinates using an iterative nonlinear least squares technique.

13. The system of claim 11, wherein the iterative nonlinear least squares technique comprises one of a Nelder-Mead simplex algorithm, a Levenberg-Marquardt algorithm, and a gradient descent algorithm.

14. The system of claim 9, wherein the data processor is adapted to calculate coordinates of the virtual wheel spindle point using a grid search algorithm.

15. The system of claim 9, comprising a clamp for affixing the target to the wheel such that the target origin is offset from the wheel axis of rotation.

16. The system of claim 9, comprising a clamp for affixing the target to the wheel such that the target origin is disposed substantially on the wheel axis of rotation.

17. The system of claim 9, wherein the data processor is adapted to compare coordinates of the calculated virtual wheel spindle point to predetermined reference virtual wheel spindle coordinates, and inform a user when the calculated virtual wheel spindle coordinates are outside the range of reference virtual wheel spindle coordinates.

* * * * *